Feb. 16, 1965 R. C. BENTON 3,169,321
POSITIONING TABLE WITH COMPENSATING MECHANISM
Filed Sept. 21, 1961 4 Sheets-Sheet 1

INVENTOR.
Robert C. Benton
BY John W. Gaines
HIS ATTORNEY

Feb. 16, 1965 R. C. BENTON 3,169,321
POSITIONING TABLE WITH COMPENSATING MECHANISM
Filed Sept. 21, 1961 4 Sheets-Sheet 2

INVENTOR.
Robert C. Benton
BY John W. Gaines
HIS ATTORNEY

Feb. 16, 1965  R. C. BENTON  3,169,321
POSITIONING TABLE WITH COMPENSATING MECHANISM
Filed Sept. 21, 1961  4 Sheets-Sheet 3

INVENTOR.
Robert C. Benton
BY John W. Gaines
HIS ATTORNEY

United States Patent Office 3,169,321
Patented Feb. 16, 1965

3,169,321
POSITIONING TABLE WITH COMPENSATING MECHANISM
Robert C. Benton, State College, Pa., assignor to Centre Circuits, Inc., State College, Pa., a corporation of Pennsylvania
Filed Sept. 21, 1961, Ser. No. 139,789
14 Claims. (Cl. 33—125)

The present application relates to a positioning table which is adapted to support a workpiece and which is supported on mutually perpendicular upper and lower ways affording the table universal rectilinear movement along two coordinate axes. It more particularly relates to counteracting or compensating mechanisms connected to the table which automatically shift to make compensation for deviations of the table from the exact position intended owing to error of the ways. With such compensation, the accuracy of gaging the table is materially increased.

In many machine tools, the workpiece positioning mechanism or table which is provided enables the workpiece to be shifted from one gaged point to another in a horizontal plane for machining as desired. This construction is referred to according to the practice as a two axis table. However, in the case of a vertical boring mill, for example, in which the level of the table itself is also changed by a vertical adjustment, then in such a case, it can properly be said to be a three axis table. Due to imprecision in manufacture, these two axis or three axis tables have a built-in error in the horizontal plane owing to the ways not being square, not straight, or to the table's failure to be clamped straight (i.e., failure to be clamped without shift sideways as part of the clamping operation itself). Also, error tends to develop in service due to wear. Therefore, it is the practice to machine the more exact tables with closer tolerances and fits in the ways, thus causing the manufacturing expense to become appreciable with high acuracy tables.

It is the purpose of this invention to substantially counteract or offset this inherent error arising in the gaging, without the high accuracy machining practices resorted to as the cure. Thus the lower ways, which are provided between a supporting base and an intermediate or saddle element hereof, have ordinary straightness and the upper ways provided between the saddle and the table itself have ordinary straightness and only approximate perpendicularity to the lower ways. The amount of straightness actually varies from table to table of the same make, owing to manufacturing variations. For use with my compensating mechanism, I provide an accurately machined straight edge on the supporting base and I dispose it as accurately as practicable in parallel to the lower ways which in practice conform to the longitudinal, horizontal axis of the base. I also provide another accurately machined straight edge on one of the longitudinal sides of the table itself, and in a relation so as to be precisely perpendicular to the other straight edge within the limits of the accuracy of the lower ways.

The saddle referred to carries two vertically disposed cam followers each of which rides against a different one of the straight edges and which deviates slightly in its angular position due to the relative motion between it and the straight edge as the table and saddle undergo relative movement on their not-perfect ways.

One of the compensating mechanisms which I provide is operated by the cam follower riding on the table-mounted straight edge. It is a simple three-member motion transmitting device connected to one of the bipartite parts of a gaging means provided on the saddle and base and cooperating with the other bipartite gaging means part for effecting accurately gaged positions of the saddle. The three-member device and the follower are carried by the saddle so that deviations in the distance of the straight edge on the table with respect to a point fixed relative to the saddle are automatically sensed and compensated for in a one-to-one ratio in the gaging means.

Another of my compensating mechanisms comprises a linkage on the saddle, which linkage is operated by a cam follower riding the straight edge on the base, and which is connected to one of the bipartite gage means provided on the saddle and table. The two parts of the bipartite gage means accurately gage the distance of the straight edge on the table with respect to a point fixed relative to the saddle. Therefore, movement of the said one bipartite part compensates for deviational shift of the saddle with respect to the base and this movement is transmitted so as to shift the gaging means for the table by an exactly equal and opposite amount with respect to the saddle.

In the foregoing fashion, an automatic compensation is effected by my devices which negates error due to lack of straightness in either the upper or lower or both ways, error due to wear in the ways, and failure of these ways to be squarely perpendicular to one another. Moreover, when the lower ways are clamped in final table position, resulting in slight length wise shift of the table due to transverse clearance being taken up in the lower ways supporting the saddle, the error is likewise counteracted; also clamping action in the upper ways tending to shift the table transversely is compensated for and correct gage placement results.

Further features, objects and advantages will either be specifically pointed out or become apparent when, for a better understanding of the invention, reference is made to the following description taken in conjunction with the accompanying drawings in which.

Figure 1:
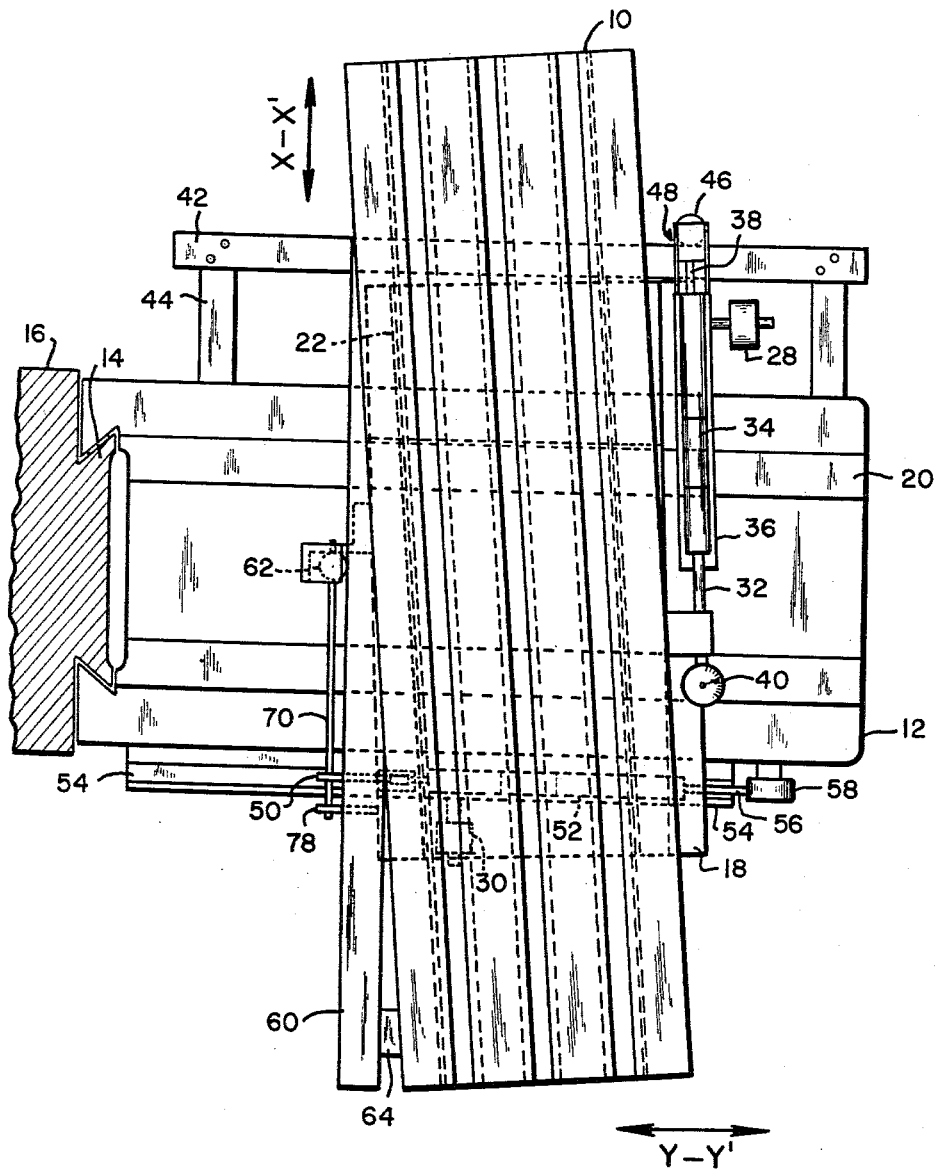
FIGURE 1 is a plan view of a vertical boring mill table embodying the present invention.

In FIGURES 1-4 of the drawings, the workpiece positioning table 10 for a boring mill 16 is shown of which an adjustable knee 12 forms the supporting base for the table 10. The knee or base 12 is vertically adjustable on a set of ways 14 carried by the mill 16 in the usual way; the adjustment mechanism is conventional and is therefore not shown.

A saddle 18 disposed intermediate the knee 12 and the table 10 is supported by ways 20 extending longitudinally of the knee and supports the table 10 on ways 22 which extend longitudinally of and below the table 10. The longitudinal axis of the table 10 is at right angles to the axis of the knee 12 and the table has universal rectilinear movement from point to point in a horizontal plane; as each final point is reached, a pair of clamping shoes 24 and 26 are actuated to clamp the table 10 and the intermediate support or saddle 18 on their respective first and second ways 22 and 20. The shoes 24 and 26 are separately operated. The can be controlled manually or, as illustrated, by means of the respective automatically operated air cylinders 28 and 30 connected thereto. The mill then performs a machining operation.

Figure 4:
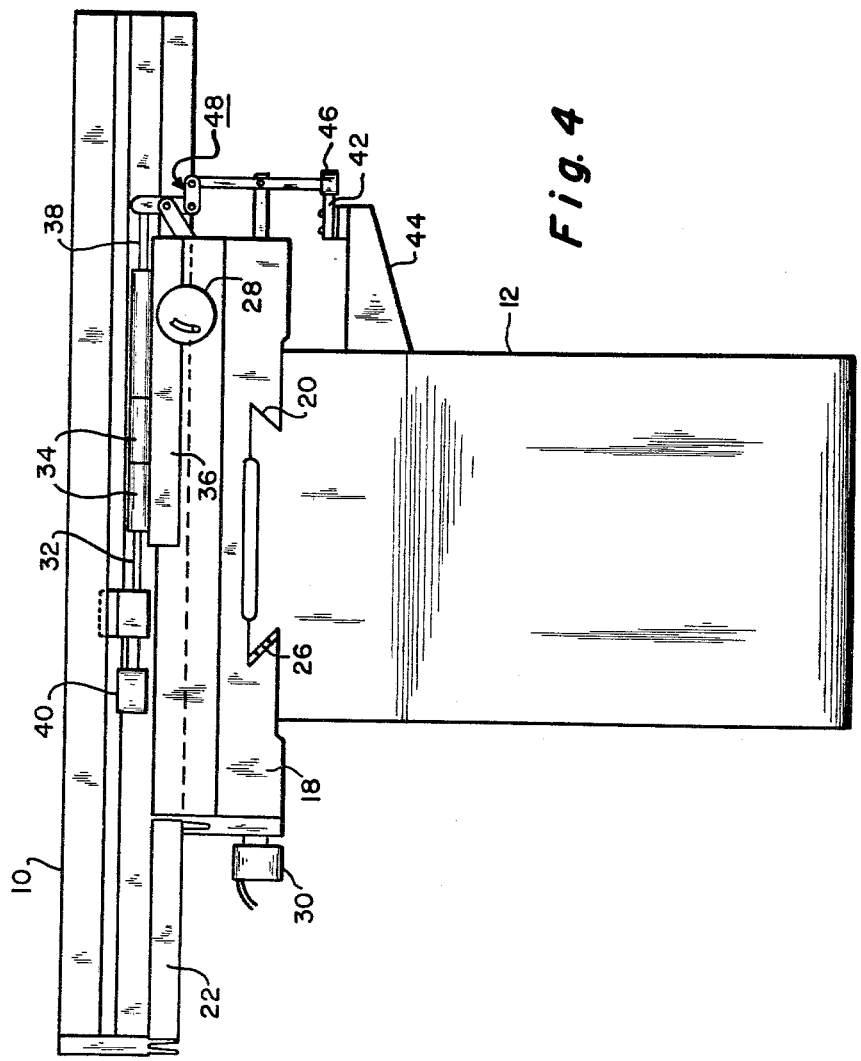
FIGURE 4 is a front elevational view of the table.

One bipartite gage means consists of a contact piece 32 (FIGURES 1 and 4) and a longitudinal gage part engaged by the contact piece 32 and consisting of an aligned series of one or more gage rod pieces 34. The gage rods 34 are part of a conventional set which measure to the usual standards of accuracy so that they add in aggregate to give a predetermined displacement of the table 10 in the longitudinal direction indicated by the arrow X–X' in FIGURE 1. They are supported in a V-trough 36 carried by the saddle 18 at the outer side; the gage rods 34 are engaged at the end opposite to the contacting part 32 by means of a stop 38. An accurate dial indicator is mounted at one end or the other of the gage rod pieces 34 for affording sensitivity of final contact and as actually illustrated at 40 this indicator in FIGURES 1 and 4 is attached to the table 10 and shiftably carries the contact piece 32.

A precision straight edge 42 which is supported by brackets 44 on the base 12 is engaged by a journalled roller forming a vertically disposed cam follower 46 which is biased to ride along the edge of the straight edge. The saddle 18 carries a three bar linkage 48 which is operated by pivoting of the vertical follower 46 and which is connected for adjusting the stop 38 and the longitudinal gage part. It will be understood that when the shoe 26 is clamped against the ways 20, thus shifting the saddle 18 a slight clearance amount to the left as viewed in FIGURE 4, the three bar linkage 48 operates to shift the stop 38 and allow the series of gage rods 34 to move by an equal and opposite amount to the right. Therefore, in order for the dial indicator 40 to read to the desired zero position, the table 10 must first be moved by the operator along the ways 22 so as to be in the same position with relation to the support 12 as if the saddle 18 had never deviated slightly transversely in the ways 20.

It is evident that the out-of-squareness of the ways 22 and the corresponding out-of-squareness of the table 10 in its posture in FIGURE 1 has been greatly exaggerated for purposes of illustration. Actually the deviational error would not be visibly perceptible in FIGURE 1.

Another bipartite gage means consists first of a contact part 50 (FIGURES 1, 2 and 3) pivotally carried by the saddle 18 and, second, a part which is contacted by the contact part and comprising another series of gage rod pieces 52. The gage rods 52 are carried in a V-trough 54 supported by the base 12 and the rods are engaged at their opposite end by means of a stop 56. The rods 52 establish the position of the table and saddle in the Y–Y' direction of FIGURE 1. For the sake of accuracy of establishing final contact, a dial indicator is interposed at one or the other end of the gage rods 52 and as illustrated in FIGURES 1 and 2, the dial indicator identified by the numeral 58 is secured to the knee 12 and shiftably carries the stop 56.

A precision straight edge 60 (FIGURES 2 and 3) carried by the table 10 is engaged by a journalled roller forming a vertically disposed cam follower 62 that is biased to ride along the straight edge. The straight edge 60 is supported by brackets 64 in a position generally parallel to a longitudinal edge of the table 10. The straight edge 60 is fixed squarely at right angles to the ways 20 or, in case the straight edge 42 is employed, the straight edge 60 is placed precisely at right angles to the straight edge 42 within the limits of the accuracy of the ways 20. In some instances, however, the straight edge 42 and linkage 48 are omitted and no compensation is made for error in the ways 20.

The saddle 18 carries a pivoted link member 68 of another compensating mechanism 66 which is thus operated by the cam follower 62 and which is connected to the pivoted contact part 50 of the gage means.

Figure 2:
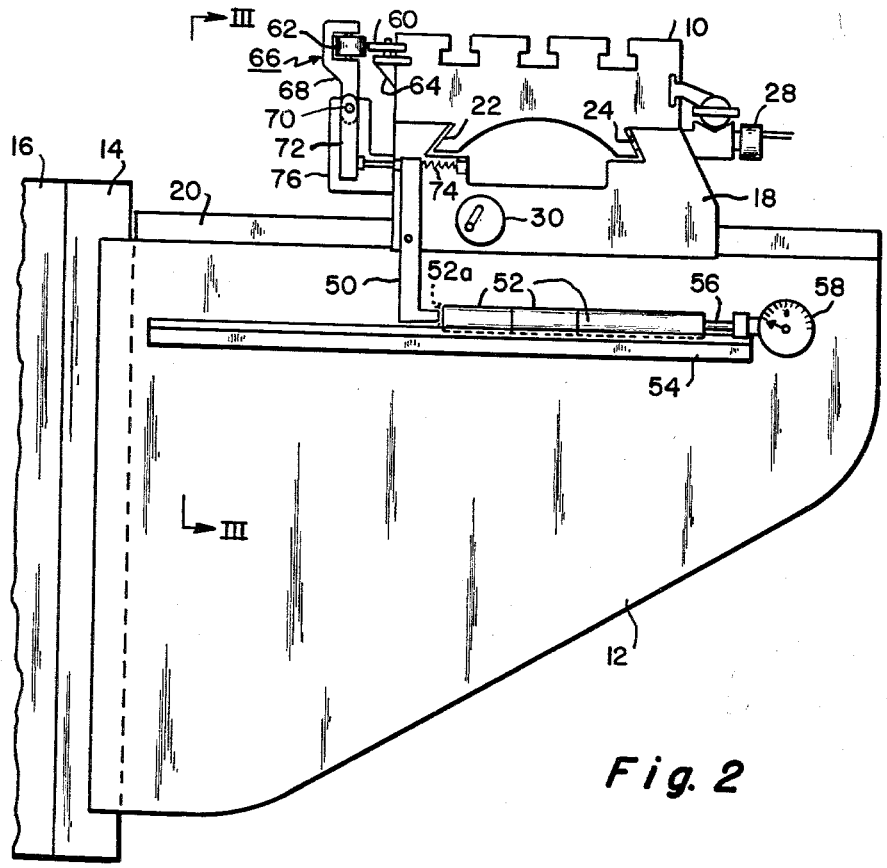
FIGURE 2 is a side elevational view of the table and its supporting structure.
Figure 3:
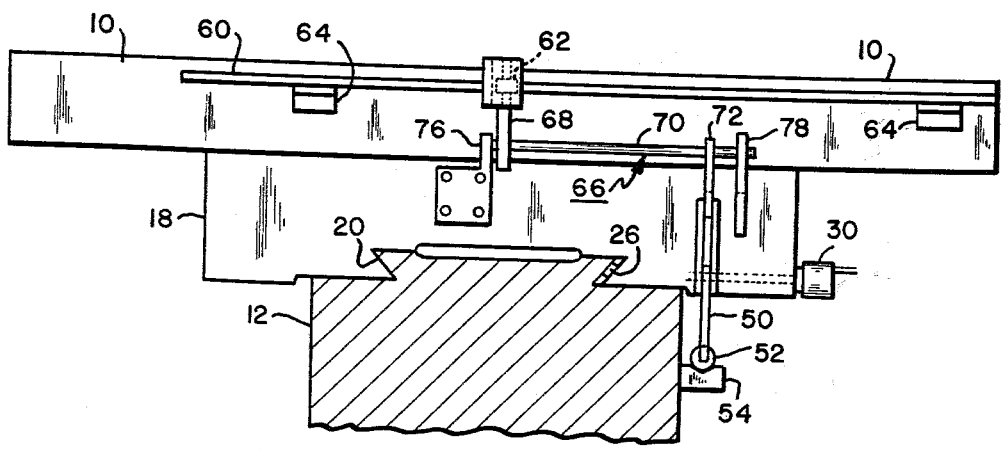
FIGURE 3 is a sectional view in elevation taken along lines III—III of FIGURE 2.

It will be understood that movement of the table 10 to the leftward as viewed in FIGURE 2, owing to clearance shift in the ways 22 due to engagement of the clamping shoe 24, will be communicated through the link member 68 and the mechanism 66 to the contact part 50 so as to give the series of gage rods 52 clearance to move to the left into the new position of engagement shown by the dotted lines 52a against the part 50. Therefore, in order for the dial indicator 58 to give the proper zero reading, the saddle 18 must necessarily be moved by the operator to the right whereby the part 50 restores the rods 52 from their dotted line position 52a to the solid line position shown in FIGURE 2. This amount is equal and opposite to the shift in take-up clearance of the ways 22 caused by the clamping shoe 24.

It will likewise be understood that in the usual case wherein the ways 22 are not precisely parallel with the accurately related straight edge 60, longitudinal movement of table 10 will cause the cam follower 62 and member 68 to deviate slightly by rotating one way or the other in the plane of FIGURE 2. A similar deviation will therefore occur in the angularity of the contact part 50 and so the operator must re-adjust by shifting the saddle 18 sufficiently that the dial indicator 58 will properly read zero establishing the corrected position of the table 10.

If the ways 22 are not machined with precise straightness at all points, the cam follower 62 will deflect in the manner foregoing thus requiring the operator to re-adjust the saddle 18 on its ways 20 so that the dial indicator 50 will read properly at the zero point.

The compensating mechanism 66 is a three member device including the link member 68 which is pivoted to the saddle 18 preferably midway of one longitudinal edge of the saddle. It thus stays centered with respect to the mill, lying in the vertical midplane containing the boring head, not shown. A torsion rod member 70 carried by the saddle connects the member 68 to a depending link member 72 which transmits motion to a bifurcated upper end of the pivoted contact part 50. A compression spring 74 engages the same end of the contact part 50. The torsion rod 70 member is set in bearing plates 76 and 78 for free journalling with respect to the saddle 18.

Figure 5:
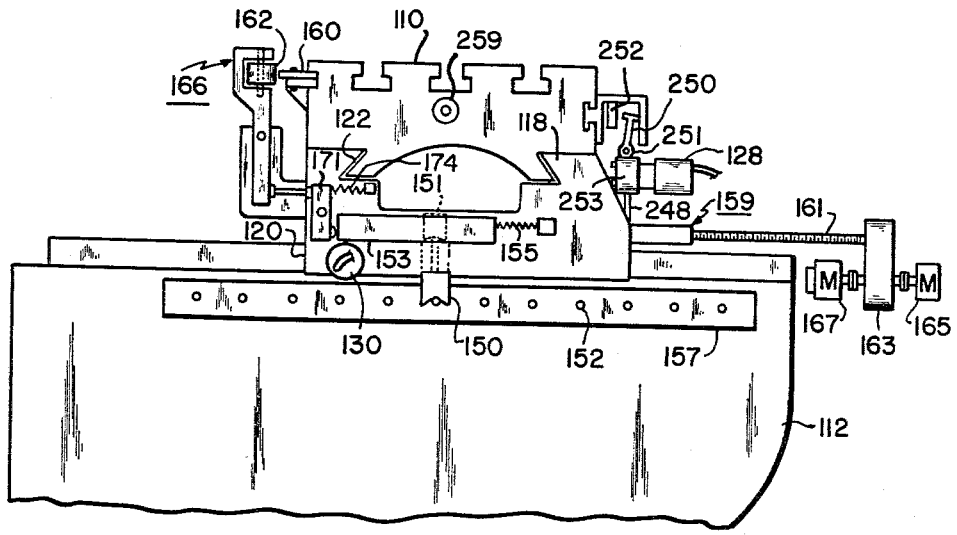
FIGURE 5 is similar to FIGURE 2 but shows a modified form of the invention.

A modified embodiment of the invention is shown in FIGURE 5. In this embodiment, the saddle 118 is supported by way means 120 on a knee or base 112 and supports a table 110 on means 122 on the saddle 118. A cam follower 162 riding a straight edge 160 operates a three member linkage 166 to control a pivoted link 171 which is biased at the upper end by a moderately strong compression spring 174 and which is carried by the saddle 118.

A small increment positioner 153 is carried by the saddle 118; the small increment positioner 153 is guided for movement thereon by means, not shown, to move a limited distance in a straight line disposed parallel to the way means 120 on which the saddle 118 is supported. The contact part 150 of the bipartite gage means consists of a pawl pivoted at 151 to slidable mechanism within the frame of the small increment positioner 153. A light compression spring 155 engages the positioner 153 at one end and the link 171 engages the opposite end of the positioner 153. The longitudinally extending part of the gage means is supported by the base 112 and comprises a line of pins 152 carried by a bar 157.

A large increment positioner 159 comprises a lead screw 161 which is connected to the saddle 118 and which is driven by a gear box 163 to control the position of the saddle 118 with reference to the base 112. A pair of drive motors 165 and 167 is connected to respective input shafts of the gear box 163 for controlling the shaft rotation of the lead screw 161.

In a manner more completely described and claimed in the copending Benton application Serial No. 104,990 filed April 24, 1961, the large increment positioner 159 automatically positions the saddle 118 in the Y ordinate direction to a point opposite an appropriate one of the line of pins 152; these pins have accurate center to center distances one inch apart on the bar 157. The pawl-carrying, small increment positioner 153 operates meantime to index the pawl in the Y ordinate direction correctly to a measurement of some fractional part of an inch with respect to the frame of the positioner 153 so that the accurately gaged total reading will aggregate a full number of inches plus some fraction of an inch automatically. The contact part 150 is actually a stopping pawl; when it is automatically pivoted in frontal movement at the right time into engagement with the right pin in the line of pins 152, the pins due to their relative transverse movement deflect the pawl so as to trip open a stopping circuit connected thereto. The stopping circuit is connected to control the motors 165 and 167 and stops them. Then a clamping cylinder 130 operates to clamp the saddle 118 in its position with respect to the way means 120.

Meantime, if operation of the clamping cylinder 128 or if a variation in the way means 122 causes the table 110 to shift to the left for instance as viewed in FIGURE 5, the frame of the small increment positioner 153 controlled by the spring 155 and by the three bar linkage 166 will be shifted by the same distance to the left; therefore the saddle 118 will automatically be moved by the large increment positioner 159 by an equal and opposite amount to the right with the result that the contact part 150 takes the assigned relation with respect to the aligned one of the pins 152.

For effecting adjustments along the other axis, the embodiment of FIGURE 5 includes another contact pawl part 250 of the gage means; the part 250 is pivoted at 251 to the frame of another fractional increment positioner 253. A three bar linkage 248 corresponding to the linkage 48 of the preceding embodiment makes a compensation initiating adjustment to the frame of the positioner 253. The rest of the bipartite gaging means consists of the longitudinally extending part of inverted U-shape supported by the table 110 and supporting a line of pins 252 which are accurately spaced apart thereon one inch from center to center.

The three bar linkage 248 is operated in the same way as the linkage 48 of the embodiment of FIGURE 4 wherein the interaction of the straight edge 42 and the cam follower 46 provides the actuating motion.

Another large increment positioner schematically appearing at 259 operates the table 110 on its ways 122 in a manner analogous to the operation of the saddle 118 just discussed, by means of the large increment positioner 159. It automatically positions the table until the proper pin 252 comes opposite the pawl part 250 for a proper reading in terms of a whole number of inches. The setting of the pawl part 250 by means of the small increment positioner 253 accounts for the fractional inch portion of the final setting. When the table 110 reaches the final setting, the clamping operation is performed by a cylinder 128 so as to clamp the table 110 on its ways.

Figure 6:
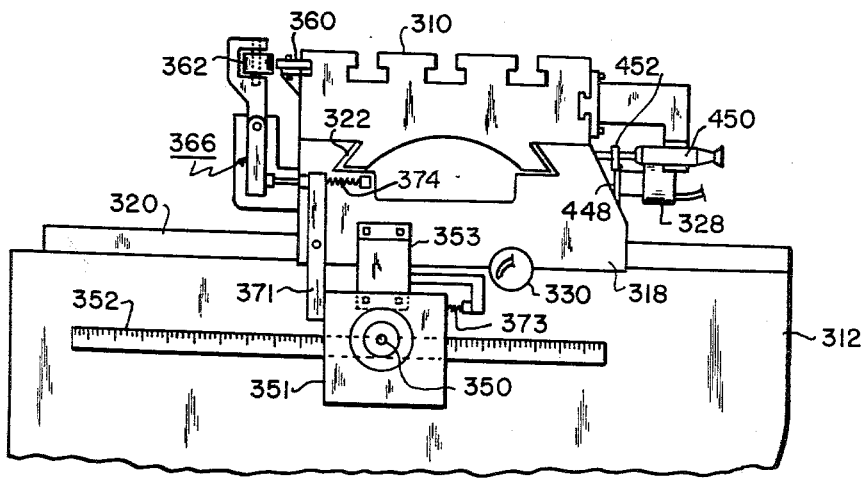
FIGURE 6 shows another modification.

In the embodiment of FIGURE 6, a saddle 318 is supported by first way means 320 on a supporting base 312 and supports a table 310 on second way means 332 carried by the saddle 318. The first and second way means extend in the respective X and Y coordinate directions. In one bipartite gauge means, a finely divided scale 352 of high accuracy constitutes the longitudinally extending one of the parts and is mounted on the base 312. The other part consists of an optical piece 350 providing large magnification for reading the scale. It is carried on a slide 351 supported from a bracket 353 fixed to the saddle 318 for sliding motion in the scale direction relative to the saddle.

A cam follower 362 which is biased to ride a straight edge 360 fixed to the table 310 operates through a three member linkage 366 to indicate appropriate adjustment in the final position of the slide 351 and the optical piece 350 whenever the moving table 310 has deviational shift in the ways due to the operating characteristics noted. A link 371 engaged by the three member linkage 366 and a light compression spring 373 make the actual adjustment in the position of the slide 351. A spring 374, pressing in engagement with the inner surface of the upper end of the link 371, exerts sufficient pressure and both biases the follower 362 firmly against the straight edge 360 and biases the lower end of the link 371 firmly against the slide 351.

A three bar linkage 448 controls the position of a slidably mounted gage means part consisting of another longitudinal scale 452 that is capable of limited shifting movement relative to the saddle 318. The cooperating optical piece 450 is carried by the table 310. So as to enable the parts 452 and 450 to read properly, the scale 452 on the saddle 318 will have automatically been shifted in position thereon by an equal and opposite amount to the deviational error in the way means 320 which supports the saddle 318.

The advantage of the embodiment of FIGURE 6 is the direct operation whereby the operator reads off the table settings directly by means of the optical parts 350 and 450. The scale readings are so magnified that acceptably accurate results are obtained without gage rods being necessary as in the embodiment of FIGURE 1, preceding.

In the gage means as herein disclosed in FIGURES 1 and 6, the longitudinally extending bipartite parts 34 and 452 respectively are shown carried by the saddle; whereas the corresponding longitudinally extending bipartite part consisting of the line of pins 252 in the embodiment of FIGURE 5 is shown carried by the table 110. It is immaterial which of the components (i.e., the saddle or the table) carries the longitudinally extending bipartite part, so long as the coacting part 32 (FIGURE 1) or 250 (FIGURE 5) or 450 (FIGURE 6) is carried by the other component. So also according to the embodiments of FIGURES 1, 5 and 6, the base is the component which carries the longitudinally extending one of the bipartite parts 52, 152, and 352 but self-evidently the parts can be reversed as between these components so that the saddle is the component which carries the longitudinally extending bipartite parts 52, 152 and 352, respectively.

It will be appreciated that the straight edges and cam followers of the foregoing embodiments are lightly loaded at most, being never subjected to the load of the table, saddle, or the workpiece being carried by the table. The regular ways are the real load supporting members. Therefore, problems of wear along the edges of the straight edges is of minor significance if at all.

The ratio of lengths of the links of the three bar linkages of each of the preceding embodiments is selected such that motion is transmitted in a one-to-one ratio and with no net change in direction. Similarly, the ratio of the lengths of the members of the three member linkages is selected so that a one-to-one motion ratio is maintained with no overall change of direction.

Variations within the spirit and scope of the invention described are equally comprehended by the foregoing description.

I claim:

1. Mechanism for compensating in the position of gage pieces of a positioning table, said table having a supported base with supporting means supporting the table on said base for universal rectilinear movement of the table along two coordinate axes, said mechanism comprising a first gage piece which is shiftably mounted on the supporting means supporting said table, a linkage carried by said supporting means, said linkage having a cam follower to actuate the links thereof and being connected to shift said gage piece by a limited amount attendant with the engagement of the latter with a second gage piece carried by the base, and a straight edge on said table engaging the cam follower for operating the linkage to shift said first gage piece by an offsetting amount and direction the same as said cam follower is shifted.

2. Means for compensating in the relative position of gage pieces of a positioning table, said table having a supported base and supporting means on said base supporting the table for universal rectilinear movement along two coordinate axes, said means comprising a first gage piece shiftably mounted on said supporting means, mechanism having a cam follower to actuate the elements thereof and connected to shift said gage piece so as to cause it to take a different relative position with respect to a cooperating gage piece carried by said table, and a straight edge on said base engaging said cam follower, the ratio of the lengths of the elements in said mechanism being selected so that deflections of the cam follower in response to errors of movement of the positioning table on the ways are reproduced in direction and amount by a corresponding compensating shift of the first gage piece carried by said supporting means.

3. In a two axis table positioning mechanism provided with a table element and a base, said mechanism having a saddle carried on means on said base and carrying said table element on means on said saddle so as to support the table element for movement in X and Y coordinate directions, said means on said base and on said saddle consisting of first and second ways extending in the respective X and Y coordinate directions, the improved combination of bipartite gage means one part of which being carried by said saddle and another carried by said base, and consisting of a longitudinal part extending in the y ordinate direction and a coacting part and together effective for the accurate gaging of the position of the table element along the axis of said second ways, said saddle provided with compensating mechanism thereon connected to the one bipartite part carried by said saddle and engageable with means on said table element for displacing said one part by a counteracting amount equal to the deviational effect arising due to imperfect operational characteristics of the first set of ways.

4. In a table positioning mechanism provided with first and second elements one being a table element and the other being a base element, said mechanism having a saddle carried on means on said base element and carrying said table element on means on said saddle so as to support the table element for movement of the table element in X and Y coordinate directions, said means on said base element and on said saddle consisting of first and second ways establishing axes extending in the respective X and Y coordinate directions, and bipartite gage means one part of which being carried by said saddle and another carried by the first element, said parts consisting of a longitudinal part extending in the X coordinate direction and a coacting part and together effective for the accurate gauging of the position of the table along the axis of the first ways, the improvement comprising the combination with said saddle and said elements, of a straight edge secured to the second element, and a follower riding thereon and connected for movement with the saddle, said saddle carrying compensating means operated by said follower and connected for displacing said one part carried by the saddle by an amount equal to and in an offsetting direction with respect to the deviational error due to inaccuracy or imperfect fit occurring in the second ways.

5. In a two axis table positioning mechanism provided with a table and a base element, said mechanism having a saddle carried by means on said base element and carrying said table by means on said saddle so as to support the table for movement of the table in X and Y coordinate directions, said means on said saddle and on said base element consisting of first and second ways defining axes extending in the respective X and Y coordinate directions, the improved combination of bipartite gage means, one part of which being carried by said saddle and another carried by said table and consisting of a longitudinal part extending in the X coordinate direction and a coacting part and together effective for the accurate gaging of the position of the table along the axis of the first ways, said saddle provided with compensating mechanism thereon connected to the one bipartite part carried by said saddle and engageable with means on the base element for displacing said one part by a counteracting amount equal to the deviational effect of the second ways.

6. In two axis table positioning mechanism provided with a base for supporting the table and a saddle carried on means on said base and carrying said table on means on said saddle so as to support the table for universal rectilinear movement in a substantially horizontal plane, said means on said saddle and on said base consisting of sets of ways disposed substantially at right angles to one another, the improved combination of first bipartite gage means one part of which being carried by said saddle and another carried by said table and consisting of a longitudinally extending part disposed parallel to the axis of the ways on said saddle and a coacting part and together effective for the accurate gaging of the position of the table on the ways just named, said saddle provided with first compensating mechanism thereon connected to the one bipartite part carried by said saddle and engageable with means on said base for displacing said one part by a counteracting amount equal to the deviational effect arising due to imperfect operational characteristics of the ways on said base, second bipartite gage means one part of which being carried by said saddle and another carried by said base, and consisting of a longitudinally extending part disposed parallel to the axis of the ways on said base and a coacting part and together effective for the accurate gaging of the position of the table and the saddle along the axis of the ways on said base, said saddle provided with second compensating mechanism thereon connected to the one of the second bipartite gage means parts carried by said saddle and engageable with means on said table for displacing the just said one part by a counteracting amount equal to the deviational effect due to imperfect operational characteristics of the ways on said saddle.

7. In two axis table positioning mechanism provided with a supporting base for the table, said mechanism having a saddle carried on means on said base and carrying said table on means on said saddle so as to support the table for universal rectilinear movement in a substantially horizontal plane, said means on said saddle and on said base consisting of sets of ways disposed substantially at right angles to one another, the improved combination of bipartite gage means consisting of a longitudinally extending part carried by said base in parallel relation to the axis of the ways on said base and a coacting part carried by said saddle and together effective for the accurate gaging of the position of the table and saddle along the axis of the ways on said base, said saddle provided with compensating mechanism thereon connected to said coacting part carried by said saddle and engageable with means on said table for displacing said coacting part by a counteracting amount equal to the deviational effect arising due to imperfect operational characteristics of the ways on said saddle.

8. In a table positioning mechanism provided with first and second elements one being a table element and the other being a base element, a saddle carried on way means on the base element and carrying the table element on way means on said saddle for movement of the table in X and Y coordinate directions, said way means consisting of first and second ways with their axes extending in the respective X and Y coordinate directions, and bipartite gage means one part of which being carried by said saddle and another carried by the second element, said parts consisting of a longitudinal part extending in the Y ordinate direction and a coacting part and together effective for the accurate gaging of the position of the table element along the axis of the second ways, the improvement comprising the combination with said saddle and said elements, of a straight edge secured to the first element, and a follower riding thereon, said saddle carrying compensating means operated by said follower and connected for displacing said one part carried by the saddle in a direction and in an amount equal to the deviational error if any in the accuracy and fit of the first ways.

9. A positioning table mechanism comprising the combination of first and second elements one being a table element and the other being a base element, a saddle carried on means on the base element and carrying the table element on means on said saddle for movement of the table element in X and Y coordinate directions, said means on said saddle and on said base element consisting of first and second ways with their axes conforming to the respective X and Y coordinate directions, bipartite gage means one part of which being carried by said saddle and another carried by the first element, said parts consisting of a longitudinal part extending in the X coordinate direction and a coacting part and together effective for the accurate gaging of the position of the table element along the axis of the first ways, second bipartite gage means one part of which being carried by said saddle and another carried by the second element, said second bipartite gage parts consisting of a longitudinal part extending in the Y ordinate direction and a coacting part and together effective for the accurate gaging of the position of the table along the axis of the second ways, straight means secured to said second element in parallel relation to the second ways, and a follower riding on said straight means, said saddle carrying compensating means operated by said follower and connected for displacing one of said bipartite parts carried by said saddle in the direction of and by an amount equal to the deviational error in the accuracy of the second ways of said table mechanism.

10. The combination according to claim 9, wherein clamping means is provided on each of the first and second ways for clamping the saddle and table element in their final position, said straight means comprising a straight edge secured to the table element so as to cause the compensating means to compensate for shift in the table element in taking up clearance space in response to actuation of the clamping means associated with the ways between said table element and said saddle.

11. The combination according to claim 9, wherein clamping means is provided on each of the first and second ways for clamping the table element and saddle in their final position, said straight means comprising a straight edge secured to the base element to cause operation of the compensating means to counteract the deviational error in the ways on said base element due to taking up clearance in response to the clamping means which operates on the ways supported by said base element.

12. In positioning table structure having a first table element, a second base element, a saddle carried on means on said base element and carrying said table element on means on said saddle for universal rectilinear movement in a horizontal plane, said means consisting of X ways on said saddle and Y ways on said base element, first clamping means effective to clamp said table element to the X ways on said saddle, second clamping means effective to clamp said saddle to the Y ways on said base element, first bipartite gage means one part of which being carried by said saddle and another part carried by said table element, said parts consisting of a longitudinally extending part disposed parallel to the axis of the X ways on said saddle and a coacting part and together effective for accurately gaging the position of said table element along said axis, and second bipartite gage means one part of which being carried by said saddle and another part carried by said base element and consisting of a longitudinally extending part disposed parallel to the Y axis of the ways on said base element and a coacting part and together effective for accurate gaging of the position of said saddle and said table element along the axis just named, the improvement comprising the combination with said saddle and said first and second elements, of first and second straight edges secured to the respective first and second elements so as to be in parallel relation to the respective X and Y ways, and first and second followers riding on the respective first and second straight edges, said saddle carrying plural compensating means each operated by one of said followers and each connected for displacing a different one of said bipartite parts carried by the saddle in a direction and by an amount equal to the deviational error incurred by the first and second clamping means taking up clearance in the respective ways, said first bipartite gage means being operated in response to the second follower and said second bipartite gage means being operated in response to the first follower.

13. In a two axis positioning table mechanism provided with first and second elements one being a table and the other being a base, said mechanism having a saddle carried on way means on the base and carrying said table on way means on the saddle for universal rectilinear movement of the table along two coordinate axes, the improved combination of bipartite gage means one part of which being adapted to be mounted on said saddle and another being carried by said base, said parts consisting of a longitudinally extending gage part disposed parallel to the axis of the way means on said base and a coacting part and together effective for accurately gaging the position of the saddle and table along the axis just said, large increment positioning means connected to move said saddle with respect to said longitudinal gage part on the base, fractional increment positioning means comprising a frame and mounting said one bipartite gage part on said saddle so that said one part is capable of incremental positioning movement with respect to said frame and said saddle, a straight edge supported on said table at right angles to the way means on said base, a follower riding said straight edge, said frame being capable of limited movement with respect to said saddle, and means on said saddle operated by said follower and connected to move said frame in amount and direction equal to the deviational error incurred due to inaccuracy of structure and fit of the way means on said saddle.

14. The combination of claim 13, including clamps operable on said way means to clamp the position of the saddle and the table in final position, second bipartite gage means consisting of a longitudinally extending part carried by said table in parallel relation to the axis of the way means on said saddle and a coacting part on the saddle and together effective for the accurate gaging of the position of the table on said axis, a second large increment positioning means connected to move said table with respect to said gage part on said saddle, second fractional increment positioning means on said saddle comprising a frame and carrying said other coacting bipartite part so that said part is capable of incremental positioning movement with respect to said frame and said saddle, a second straight edge supported by said base at right angles to the first named straight edge, a follower riding said second straight edge, and means operated by the just said follower and connected to relatively move the last said frame in an opposite direction and amount to the deviational error introduced in the relative position of the mating parts of the way means on said base due to clamping.

References Cited by the Examiner

UNITED STATES PATENTS

| 1,757,929 | 5/30 | Shaw et al. | |
| 2,236,881 | 4/41 | Rusnak | 33—125 |
| 2,612,697 | 10/52 | Mathson | 33—125 |
| 2,995,826 | 8/61 | Brault | 33—125 X |

ROBERT B. HULL, *Primary Examiner.*

ISAAC LISANN, *Examiner.*